United States Patent
Akiyama et al.

(10) Patent No.: US 7,075,870 B2
(45) Date of Patent: Jul. 11, 2006

(54) RECORDING/REPRODUCING APPARATUS FOR OPTICAL INFORMATION RECORDING MEDIUM AND OPTICAL HEAD

(75) Inventors: Tetsuya Akiyama, Hirakata (JP); Nobuo Akahira, Yawata (JP); Kenichi Nishiuchi, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 11/005,789

(22) Filed: Dec. 7, 2004

(65) Prior Publication Data

US 2005/0094532 A1    May 5, 2005

Related U.S. Application Data

(62) Division of application No. 09/413,003, filed on Oct. 5, 1999, now abandoned.

(30) Foreign Application Priority Data

Oct. 13, 1998   (JP)   ................... 10-290349

(51) Int. Cl.
*G11B 15/52*   (2006.01)

(52) U.S. Cl. .............. 369/47.51; 369/111; 369/124.02; 369/124.03

(58) Field of Classification Search .............. None
See application file for complete search history.

(56) References Cited

U.S. PATENT DOCUMENTS

| | | | | |
|---|---|---|---|---|
| 4,788,671 A | * | 11/1988 | Kanda | 369/13.39 |
| 4,807,204 A | * | 2/1989 | Mizutani et al. | 369/13.39 |
| 4,984,227 A | * | 1/1991 | Yoshimaru | 369/47.41 |
| 5,182,741 A | * | 1/1993 | Maeda et al. | 369/47.48 |
| 5,414,451 A | | 5/1995 | Sugiyama et al. | |
| 5,485,452 A | * | 1/1996 | Maeda | 369/284 |
| 5,646,929 A | * | 7/1997 | Choi | 369/44.23 |
| 5,768,221 A | * | 6/1998 | Kasami et al. | 369/14 |
| 5,796,688 A | * | 8/1998 | Gage et al. | 369/44.34 |
| 5,838,653 A | | 11/1998 | Fan et al. | |
| RE36,445 E | * | 12/1999 | Miyagawa et al. | 369/53.23 |

FOREIGN PATENT DOCUMENTS

| | | |
|---|---|---|
| CN | 1139263 | 1/1997 |
| EP | 0 818 776 | 1/1998 |
| EP | 0 840 306 | 5/1998 |
| JP | 3-157816 | 7/1991 |
| JP | 4-243024 | 8/1992 |

(Continued)

*Primary Examiner*—Paul W. Huber
(74) *Attorney, Agent, or Firm*—Hamre, Schumann, Mueller & Larson, P.C.

(57) ABSTRACT

A plurality of optical heads each of which comprises an independent light source and optical system are provided on the same side with respect to a recording medium having a plurality of recording layers. Alternatively, with respect to at least one light source in an optical head having a single objective lens and a plurality of light sources, an optical path correction system is provided on an optical path unique to the light source, and while light emitted from one light source is focused on a specific recording layer by shifting of the objective lens, light irradiated from another light source is focused on another recording layer by the optical path correction system. Thus, information can be reproduced from or recorded in a plurality of recording layers simultaneously and an error in focusing of light onto the plurality of recording layers can be suppressed.

1 Claim, 4 Drawing Sheets

FOREIGN PATENT DOCUMENTS

| | | |
|---|---|---|
| JP | 6-187662 | 7/1994 |
| WO | 96/09624 | 3/1996 |
| WO | 97/13247 | 4/1997 |
| WO | 97/28530 | 8/1997 |

* cited by examiner

RECORDING/REPRODUCING APPARATUS FOR OPTICAL INFORMATION RECORDING MEDIUM AND OPTICAL HEAD

This application is a division of application Ser. No. 09/413,003, filed Oct. 5, 1999 now abandoned, which application is incorporated herein by reference.

FIELD OF THE INVENTION

The present invention relates to a recording/reproducing apparatus for an optical information recording medium having a plurality of recording layers in which information is recorded or from which information is reproduced by irradiation of laser beams or the like.

BACKGROUND OF THE INVENTION

Because of their large-capacity and high-density memory, optical information recording media have been receiving attention. The development of an erasable type from which information can be erased and on which information can be rewritten has been pursued at present. The erasable-type optical information recording media include one in which thin films whose phase is changed between an amorphous state and a crystalline state are used as recording layers and information is recorded and erased by thermal energy through the irradiation of laser beams.

As a phase-change material for the recording layers, an alloy film containing Ge, Sb, Te, In, or the like as the main component, for example, a Ge—Sb—Te alloy film, has been known. In many cases, information is recorded by formation of marks through partial change in a recording layer into the amorphous state and information is erased by crystallization of the amorphous marks. The amorphous state can be obtained by heating the recording layer to its melting point or more and then cooling it at a speed of at least a fixed value. On the other hand, the crystallization can be carried out by heating of the recording layer to a temperature between its crystallization temperature and its melting point.

Recently, with the improvement in processing capability of various types of information-processing equipment, the amount of information to be processed has been increasing. Therefore, large-capacity recording media on which information can be recorded or from which information can be reproduced at high speed have been demanded. As a means for increasing the capacity and speed, for example, JP-A-3-157816 describes a recording medium having a plurality of recording layers and transparent separating layers provided between the recording layers and a recording/reproducing apparatus for the same. In the first recording/reproducing apparatus described in the above-mentioned JP-A-3-157816, light is focused on an intended recording layer out of the plurality of recording layers in the medium by inserting a parallel plate whose thickness is varied depending on the intended recording layer, between an objective lens and a medium. The second recording/reproducing apparatus in JP-A-3-157816 comprises one objective lens and a plurality of light sources that emit lights with different wavelengths. By utilizing the chromatic aberration of the objective lens, focal positions of respective lights irradiated from the plurality of light sources onto a medium are varied from one another. As a result, the lights are focused on a plurality of recording layers respectively at the same time. Further, in the third recording/reproducing apparatus in JP-A-3-157816, a plurality of light sources that emit lights with the same wavelength are positioned so as to have different position relationships from one another with respect to an optical system and thus the focal positions of respective lights irradiated from the plurality of light sources onto a medium are varied from one another. Consequently, the lights are focused on a plurality of recording layers respectively at the same time.

In the above-mentioned first recording/reproducing apparatus, the demand for the increase in capacity can be satisfied. However, the other demand for the increase in speed has not been satisfied sufficiently since information cannot be reproduced from or recorded in a plurality of recording layers simultaneously and therefore the data rate has been the same as in the case of using a medium with a single recording layer. Further, in the second and third recording/reproducing apparatuses, a common shifting of the objective lens is used for focusing lights irradiated from the plurality of light sources. Therefore, the relative relationships among the focal positions of lights irradiated from respective light sources are continuously constant. Consequently, when the thickness of transparent separating layers in the recording medium is different from a designed value or is uneven, it was difficult to focus the lights on the plurality of recording layers precisely, which has been a problem.

BRIEF DESCRIPTION OF THE INVENTION

The present invention solves the above-mentioned conventional problems. It is an object of the present invention to provide a recording/reproducing apparatus for an optical information recording medium and an optical head that can reproduce information from and record information in a plurality of recording layers simultaneously and can enable high-speed information transfer.

In order to attain the above-mentioned object, a recording/reproducing apparatus of the present invention is characterized in that a plurality of optical heads are positioned on the same side with respect to a recording medium and each of the plurality of optical heads comprises an independent light source and optical system. Consequently, information can be reproduced from or recorded in a plurality of recording layers simultaneously, thus enabling the high-speed information transfer.

In the above-mentioned recording/reproducing apparatus of the present invention, it is preferable that the plurality of optical heads are arranged at almost the same radial positions (i.e. at positions almost equally spaced from a rotation center). According to this preferable example, simultaneous reproduction of information from or simultaneous recording of information in a plurality of layers is facilitated in a recording system referred to as "Zone-CAV" presently employed in DVD-RAM or the like in which rotation speed is changed per recording zone on a recording medium to obtain almost constant linear velocity. More preferably, by placing the plurality of optical heads on the same carrier table, the apparatus can be simplified and decreased in size.

Further, in the above-mentioned recording/reproducing apparatus of the present invention, optimum substrate thicknesses for minimizing spot diameters of lights that are emitted from the plurality of optical heads and then are focused through a substrate are set to be different from one another beforehand, thus improving the signal quality in reproducing information from or recording information in an intended recording layer with each optical head and stability in a control system for focusing, tracking, or the like of the optical heads.

Another recording/reproducing apparatus of the present invention comprises one objective lens and a plurality of light sources. The recording/reproducing apparatus is characterized in that with respect to at least one light source, an optical path correction system having a function of controlling a focal position is provided on an optical path unique to the light source. An optical head of the present invention comprises one objective lens and a plurality of light sources. The optical head is characterized in that with respect to at least one light source, an optical path correction system having a function of controlling a focal position is provided on an optical path unique to the light source. Therefore, while light irradiated from one light source is focused on a specific recording layer by shifting of the objective lens, light irradiated from another light source can be focused on another recording layer by the optical path correction system. In other words, even when the thickness of transparent separating layers in a recording medium is different from a designed value or is uneven, lights irradiated from the plurality of light sources can be focused precisely on respective intended recording layers simultaneously.

DETAILED DESCRIPTION OF THE INVENTION

A recording/reproducing apparatus for an optical information recording medium of the present invention will be explained with reference to the drawings as follows.

First Embodiment

Figure 1:
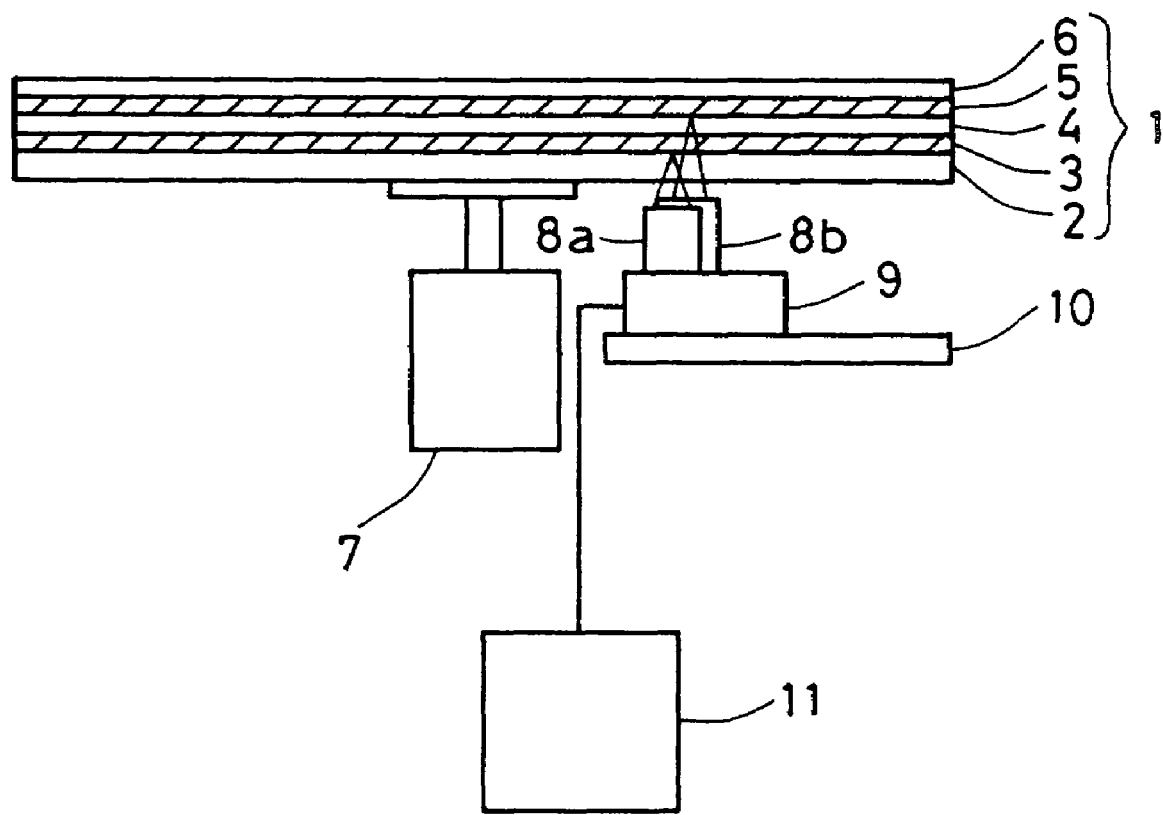
FIG. 1 is a structural view showing a first embodiment of a recording/reproducing apparatus for an optical information recording medium in the present invention.

FIG. 1 is a structural view of a recording/reproducing apparatus for an optical information recording medium in the first embodiment of the present invention. In FIG. 1, an information recording medium 1 with two recording layers has been loaded in the apparatus. The information recording medium 1 comprises: a transparent substrate 2 made of polycarbonate with a thickness of about 0.58 mm; a first recording layer 3 formed of a translucent layer with a thickness of about 10 nm; a transparent separating layer 4 with a thickness of about 0.04 mm; a second recording layer 5, and a protective layer 6. The information recording medium 1 is obtained by forming the first recording layer 3, the transparent separating layer 4, and the second recording layer 5 on the transparent substrate 2 sequentially and then providing the protective layer 6 thereon. The recording/reproducing apparatus comprises: a spindle motor 7; two optical heads 8a and 8b; a carrier table 9 on which the optical heads 8a and 8b have been installed; a shifting system 10 for moving the carrier table 9 to a desired position; and a controller 11.

Figure 2:
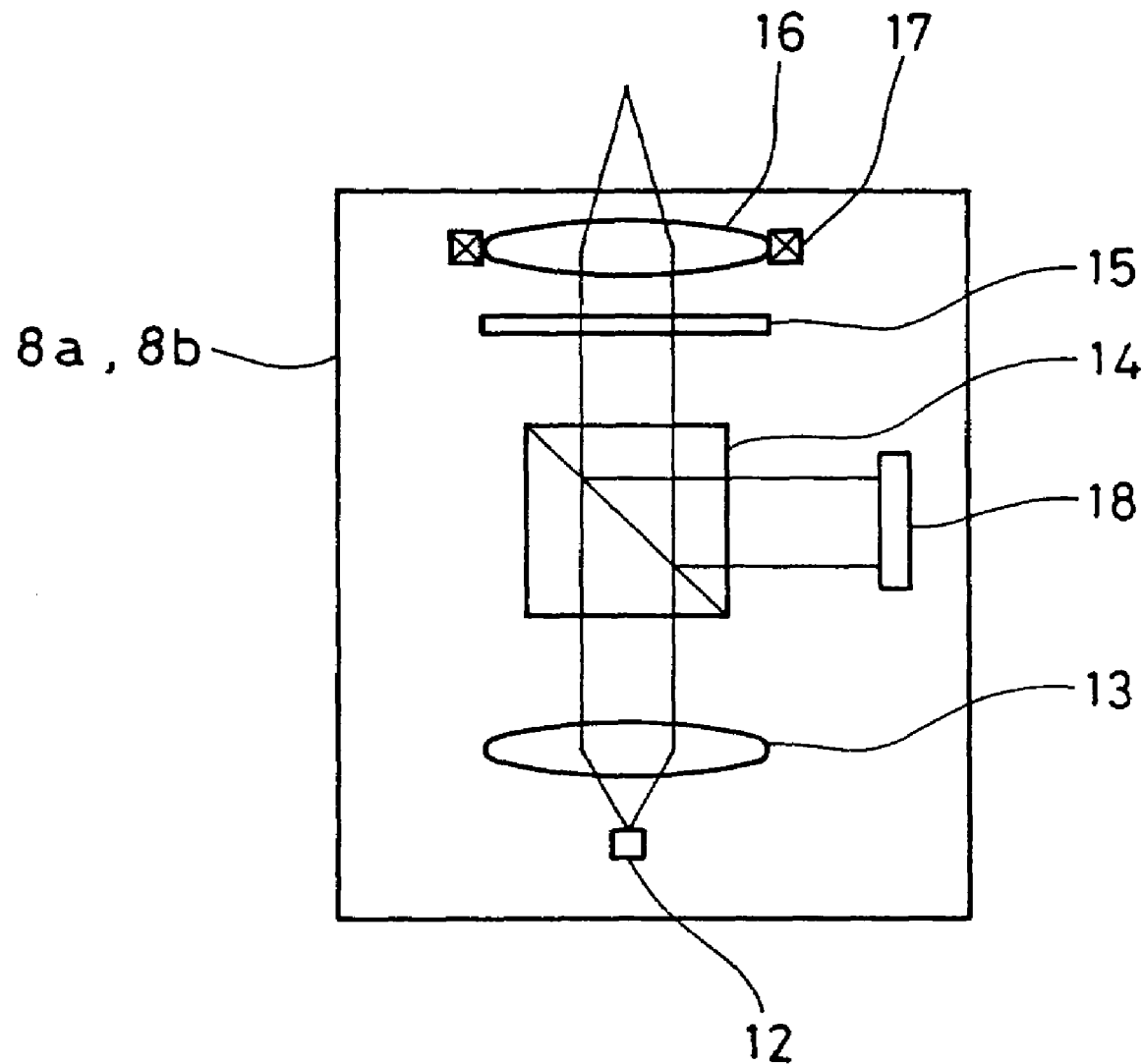
FIG. 2 is a structural view showing part of the first embodiment of a recording/reproducing apparatus for an optical information recording medium in the present invention.

FIG. 2 shows a configuration of the optical heads 8a and 8b. In the optical heads 8a and 8b, light emitted from a light source 12 of a semiconductor laser passes through a collimator lens 13, a beam splitter 14, a ¼ wave plate 15, and an objective lens 16 to be converged on the recording medium 1. The converged light is focused on a recording layer in the recording medium 1 by adjusting the position of the objective lens 16, for example, by a voice coil 17. The light reflected from the recording layer passes through the objective lens 16 and the ¼ wave plate 15 again, is reflected by the beam splitter 14, and then enters into a detector 18, thus being converted to an electric signal.

In FIG. 1, the optical heads 8a and 8b are arranged so as to be at almost the same radial positions with respect to the spindle motor 7 (i.e. at positions almost equally spaced from a rotation center). The lights irradiated from respective optical heads 8a and 8b are focused on the recording layers 3 and 5 in the above-mentioned manner. Consequently, information is reproduced from or recorded in the recording layers 3 and 5 simultaneously, thus enabling high-speed information transfer. In other words, information can be recorded or reproduced at a speed twice as fast as that in a conventional method. Further, since the optical heads 8a and 8b are provided on the same carrier table, a carrying mechanism and a control circuit for the carrying mechanism may be equivalent to those employed when one optical head is used. Thus, the increase in apparatus size caused by providing two optical heads can be diminished, which is an advantage.

In using the apparatus in combination with a recording medium for a recording system referred to as "Zone-CAV" presently employed in DVD-RAM or the like in which rotation speed is changed per recording zone (Zone) on a recording medium to obtain almost constant linear velocity, since the two optical heads are positioned at almost the same radial positions, information can be reproduced from or recorded in two recording layers simultaneously using the same reference clock through the control for allowing information to be reproduced from or recorded in the identical recording zone in the two recording layers by the two optical heads. As a result, compared to the case of using one optical head, the data rate can be doubled.

The following description will be directed to an example in which the optical heads 8a and 8b are designed so that optimum substrate thicknesses for minimizing spot diameters of lights that are irradiated from the optical heads 8a and 8b and then are focused through the substrate are different from each other according to the distance to the recording layers 3 and 5. In FIG. 1, with respect to the optical heads 8a and 8b, their optical systems are set so that the above-mentioned optimum substrate thicknesses are 0.58 mm and 0.62 mm, respectively. Therefore, when the optical head 8a irradiates light onto the recording medium 1, the light is focused at a position that the light reaches after passing through the substrate with a thickness of 0.58 mm, i.e. on the recording layer 3, without aberration. On the other hand, when the optical head 8b irradiates light onto the recording medium 1, the light is focused at a position that the light reaches after passing through the 0.58-mm substrate, the 10-nm recording layer 3, and the 0.04-mm transparent separating layer, i.e. on the recording layer 5, without aberration. Consequently, the following advantages can be obtained. That is, in addition to the improvement in signal quality in reproducing information from or recording information in respective intended recording layers with respective optical heads, the tolerance to the variation in thickness of the transparent separating layers increases.

In the above-mentioned embodiment, information was reproduced from or recorded in the two recording layers simultaneously. However, with the lights irradiated from the optical heads being focused on the two recording layers simultaneously, information can be reproduced from or recorded in the two recording layers not simultaneously but sequentially without a break by suitably switching the optical head to be used. For example, in FIG. 1, with the lights irradiated from the optical heads 8a and 8b being focused on the recording layers 3 and 5 respectively, information in the recording layer 3 is reproduced first while the optical head 8b is in a standby state. Then, the optical head to be used is switched to the optical head 8b and information in the recording layer 5 is reproduced. In this case, in shifting from the reproduction of information in the recording layer 3 to that in the recording layer 5, an operation for shifting the focal position of the optical head is not required. Therefore, information can be reproduced from a plurality of recording layers not simultaneously but sequentially without a break, which is an advantage. Furthermore, information can be reproduced or recorded for the time twice as long as in a conventional method.

In the above-mentioned embodiment, the description was directed to the combination of the recording/reproducing apparatus having two optical heads and the recording medium having two recording layers. However, the number of optical heads may be three or more and is not required to be the same as that of recording layers in a recording medium. By permitting the number of recording layers to be the same as that of optical heads, when the number of recording layers is n, the data rate can be increased by a factor of n. For example, when information is recorded in or reproduced from four recording layers using four optical heads simultaneously, the data rate can be quadrupled. In addition, even when the optical heads are placed on a plurality of carrier tables, the same effect can be obtained, although the complexity of the configuration increases.

Second Embodiment

Figure 3:
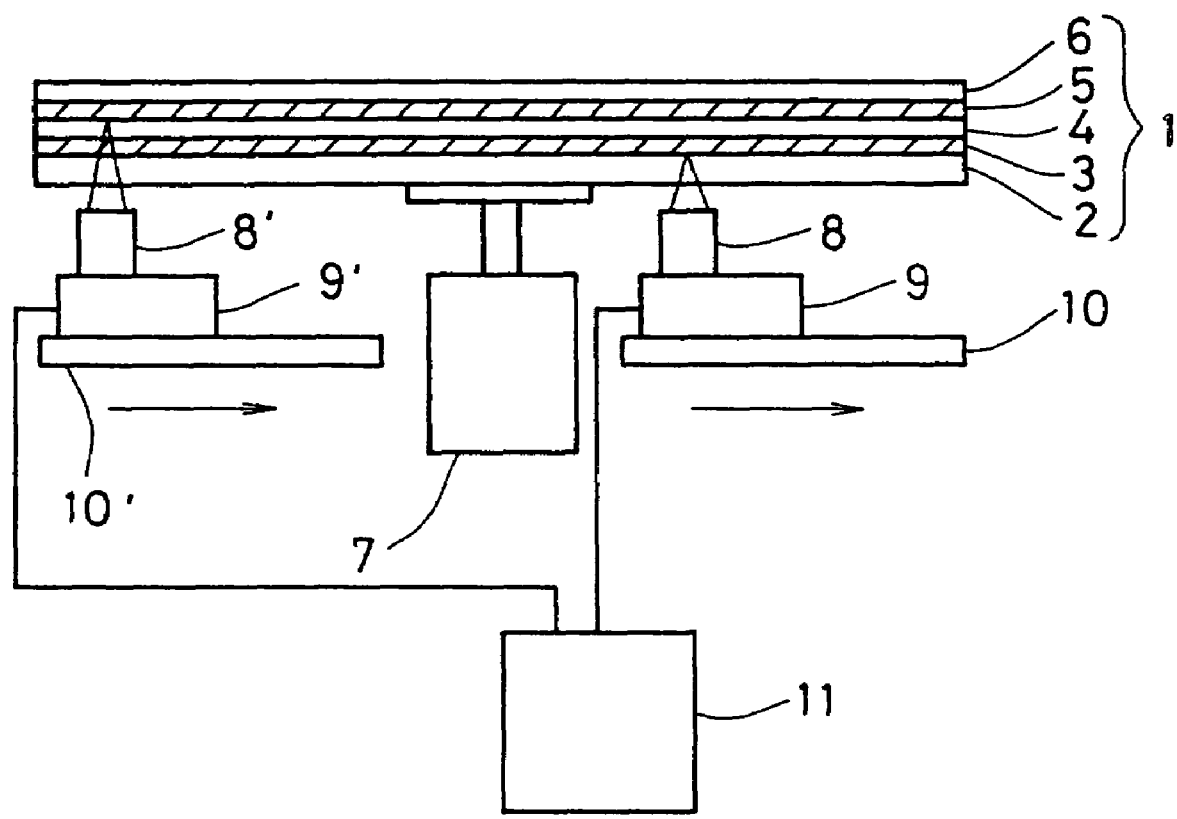
FIG. 3 is a structural view showing a second embodiment of a recording/reproducing apparatus for an optical information recording medium in the present invention.

FIG. 3 is a structural view of a recording/reproducing apparatus for an optical information recording medium in a second embodiment of the present invention. The recording/reproducing apparatus has the same configuration as that in the first embodiment shown in FIG. 1 except for the optical heads and shifting systems. A recording medium 1 has two recording layers 3 and 5 as described in the first embodiment. In each recording layer, a guide groove for tracking and address information that are not shown in the figure have been formed beforehand.

The guide groove in the recording layer 3 is formed spirally from the inner radius toward the outer radius of the recording medium 1. The guide groove in the recording layer 5 is formed spirally from the outer radius toward the inner radius of the recording medium 1. An optical head 8 reproduces information from or records information in the recording layer 3 and at the same time an optical head 8' reproduces information from or records information in the recording layer 5. A spindle motor 7 rotates continuously at a constant rotation speed. Numerals 9 and 9' indicate carrier tables on which the optical heads 8 and 8' have been placed respectively, and numerals 10 and 10' represent shifting systems thereof. In this case, the two optical heads 8 and 8' are positioned so that the total of linear velocities at their respective positions in the recording medium is almost constant. For example, the optical head 8 records or reproduces information at the innermost radius of the recording medium 1 and at the same time the optical head 8' records or reproduces information at the outermost radius of the recording medium 1. A reference clock for a recording signal is varied according to the linear velocity so that almost constant recording density can be obtained.

Thus, the total of data rates obtained by the two optical heads is almost constant. At the same time, compared to the case of using one optical head, the data rate can be doubled as a system. In addition, the rotation speed of the spindle is continuously constant and is not required to be changed corresponding to the positions of the optical heads. Therefore, not only the high data rate can be obtained, but also access speed can be increased.

In the above-mentioned embodiment, the description was directed to the combination of the recording/reproducing apparatus having two optical heads and the recording medium having two recording layers. However, the number of optical heads may be four or more as long as it is an even number, and it is not necessary to be the same as that of recording layers in a recording medium. In the case of using four or more optical heads, for example, by dividing the optical heads into two groups according to the spiral direction of recording layers corresponding to respective optical heads and placing each group on the same carrier table, the apparatus can be decreased in size.

Third Embodiment

Figure 4:
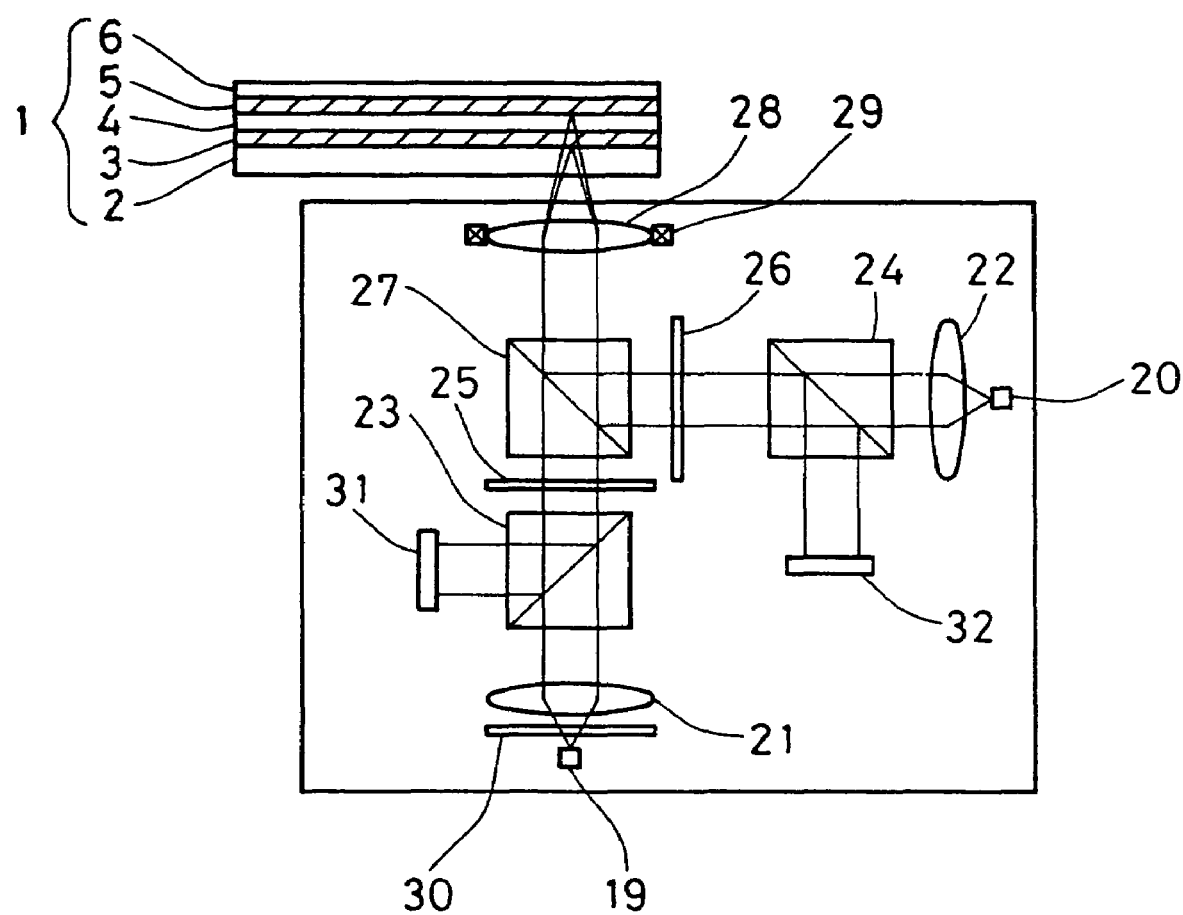
FIG. 4 is a structural view showing part of a third embodiment of a recording/reproducing apparatus for an optical information recording medium in the present invention.

The recording/reproducing apparatus for an optical information recording medium in a third embodiment of the present invention has the same configuration as that in the first embodiment shown in FIG. 1 except for an optical head. FIG. 4 shows the configuration of the optical head. The optical head is provided with light sources 19 and 20 of semiconductor lasers that emit lights with different wavelengths from each other, for example, 680 nm and 640 nm, respectively. In FIG. 4, a mirror 27 with wavelength-selectivity transmits light with a wavelength of 680 nm emitted from the light source 19 and reflects light with a wavelength of 640 nm emitted from the light source 20. The light emitted from the light source 20 passes through a collimator lens 22, a beam splitter 24, and a ¼ wave plate 26 and is reflected by the mirror 27. The reflected light passes through an objective lens 28 and thus is converged on a recording layer 3. The light reflected from the recording layer 3 passes through the objective lens 28 again, is reflected by the mirror 27, passes though the ¼ wave plate 26, is reflected by the beam splitter 24, and then enters into a detector 32, thus being converted to an electric signal. On the other hand, the light emitted from the light source 19 passes through an optical path correction system 30 formed of a liquid crystal device, a collimator lens 21, a beam splitter 23, and a ¼ wave plate 25, is transmitted by the mirror 27, and passes through the objective lens 28, thus being converged on a recording layer 5. The light reflected from the recording layer 5 passes through the objective lens 28 again, is transmitted by the mirror 27, passes through the ¼ wave plate 25, is reflected by the beam splitter 23, and then enters into a detector 31, thus being converted to an electric signal.

The light emitted from the light source 20 is focused on the recording layer 3 in a recording medium 1 having two recording layers through adjustment of the position of the objective lens 28, for example, by a voice coil 29. In this case, the light reflected from the recording layer 3 is detected by the detector 32 and then a focus error signal is generated. The voice coil 29 is controlled based on this focus error signal. At the same time, when the light emitted from the light source 19 is sought to be focused on the other recording layer 5 precisely, the shift in position of recording layer 5 due to wobbling of the recording medium 1 can be compensated by focusing of the light emitted from the light source 20 on the recording layer 3 as described above, since the shift in position of recording layer 5 is common to that of the recording layer 3. However, the shift in position of recording layer 5 due to unevenness in thickness of a transparent separating layer 4 or the like is independent from the recording layer 3 and therefore cannot be compensated by this method alone. In order to compensate this shift peculiar to the recording layer 5, the recording/reproducing apparatus of the present embodiment corrects the aberration by detecting the light reflected from the recording layer 5 by the detector 31 to generate a focus error signal and operating the optical path correction system 30 based on this focus error signal to change light intensity and phase distribution. Then the recording/reproducing apparatus adjusts the focal position corresponding to the unevenness in thickness of the transparent separating layer 4 or the like, thus enabling the light emitted from the light source 19 to be focused on the recording layer 5 precisely.

Therefore, according to the recording/reproducing apparatus in the present embodiment, the light irradiated from one light source can be focused on a specific recording layer by shifting of the objective lens and at the same time the light irradiated from the other light source can be focused on the other recording layer by the optical path correction system. Thus, even when the thickness of the transparent separating layer 4 in the recording medium is different from a designed value or is uneven, lights irradiated from a plurality of light sources can be focused precisely on respective intended recording layers simultaneously. Further, when the same objective lens is used, the focal distance of light with a short wavelength is shorter than that of light with a long wavelength. Therefore, the design of the optical system is facilitated by setting the wavelength of the light irradiated from the light source 20 used for recording of information in or reproduction of information from the recording layer 3 positioned near to the plane of incidence of light in the recording medium to be shorter than that of the light irradiated from the light source 19 used for recording of information in or reproduction of information from the recording layer 5 positioned far from the plane of incidence of light.

In the above-mentioned embodiment, the liquid crystal device was used as the optical path correction system. However, the optical path correction system may be formed of a lens provided with a movable mechanism by, for example, a piezoelectric element or the like and may be placed between the collimator lens 21 and the beam splitter 23 as long as it is placed on an optical path unique to the light emitted from the light source 19.

Furthermore, by providing the optical path correction system 30 on the optical path unique to the light irradiated from the light source 20, the light irradiated from the light source 19 may be focused on the recording layer 5 through adjustment of the position of the objective lens 28 by the voice coil 29 and the light irradiated from the light source 20 may be focused through adjustment by the optical path correction system 30.

In the above-mentioned embodiment, the wavelength of the light irradiated from the light source 20 used for recording of information in or reproduction of information from the recording layer 3 positioned near to the plane of incidence of light in the recording medium was shorter than that of the light irradiated from the light source 19 used for recording of information in or reproduction of information from the recording layer 5 positioned far from the plane of incidence of light. However, the wavelength of the light irradiated from the light source 20 may be longer than that of the light irradiated from the light source 19, when the recording layer 3 near to the plane of incidence of light in the recording medium intended for recording and reproduction of information is formed of a material in which transmittance of light decreases as the wavelength of the light becomes longer, or the like.

The number of light sources may be three or more and is not required to be the same as that of the recording layers in a recording medium.

Further, semiconductor lasers that irradiate lights with different wavelengths from each other were used as the light sources. However, the light sources that emit lights with the same wavelength may be used in the case of using another means for separating reflected lights from the recording medium that are emitted from different light sources, for example, a means for allowing the positions where images are formed by the lights reflected from the recording medium at the detector region to be different by setting optical paths of the lights emitted from the light sources 19 and 20 to have different angles from each other.

In the embodiments 1, 2, and 3, the wavelengths of lights emitted from the light sources and a numerical aperture of the objective lens are designed suitably according to the optical characteristics of the recording layers in the recording medium intended for recording and reproduction of information, the thickness of the substrate, and the like.

In the above, the descriptions were directed to the application for increasing the data rate using a plurality of heads in the same state, for example, in a recording mode or in a reproducing mode, and the application for improving the continuity by selecting one head to record information and setting the other head to be in a standby state. However, the present invention is not limited to those. When independent radial shifting systems are provided, operations of recording and reproduction that are completely independent from each other can be carried out simultaneously by placing one head in a recording mode and the other in a reproducing mode. Alternatively, the present invention may be applied as a variable time-shift apparatus in which one head records information and at the same time the other head reproduces the information that was recorded on a recording track a short while ago, which is referred to as delayed reproduction. In addition, even in the case where a radial shifting system is shared by a plurality of heads, for example, when a disk has a certain layer used exclusively for reproduction and another layer having a recordable recording film, two operations of reproduction of information from the layer used exclusively for reproduction and of recording of information in the recordable layer can be carried out simultaneously. Thus, the present invention has a wide range of applicability.

Furthermore, in the above descriptions, a disk is used as an information recording medium. However, the present invention can be applied to recording/reproducing apparatuses for multilayered media with other shapes such as a card-like shape or the like.

As described above, according to the recording/reproducing apparatus for an optical information recording medium and the optical heads of the present invention, even when the thickness of transparent separating layers in a recording medium with a plurality of recording layers is different from a designed value or is uneven, lights irradiated from a plurality of light sources can be focused precisely on respective intended different recording layers simultaneously. Consequently, information can be reproduced from or recorded in a plurality of recording layers simultaneously, thus enabling the high-speed information transfer.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A recording/reproducing apparatus for an optical information recording medium comprising an even number of recording layers provided with guide grooves for tracking formed spirally and address information, half of the recording layers having guide grooves formed in a reverse spiral direction to that of the other half, wherein the apparatus comprises an even number of optical heads provided on the same side with respect to the recording medium, positions of a pair of optical heads are set so that a total of linear velocities at their respective positions on the recording medium is almost constant when a spindle motor is rotated at a constant rotation speed, and a reference clock for a recording signal is varied according to linear velocity so that almost constant recording density can be obtained.

* * * * *